United States Patent [19]
Kulishev et al.

[11] Patent Number: 4,944,067
[45] Date of Patent: Jul. 31, 1990

[54] APPARATUS FOR BONING HAMS OF POULTRY CARCASSES

[76] Inventors: Boris V. Kulishev, Solnechnogorsky raion, p/o Rzhavki, 16, kv. 83; Yakov M. Petlakh, Solnechnogorsky raion, p/o Rzhavki, 16, kv. 98; Boris V. Elizarov, Klinsky raion, p/o Vozdvizhenskoe, 5, kv. 44, all of, Moskovskaya oblast, U.S.S.R.

[21] Appl. No.: 304,229
[22] Filed: Jan. 31, 1989
[30] Foreign Application Priority Data
   Oct. 3, 1988 [SU] U.S.S.R. .............. 4485536[I]
[51] Int. Cl.$^5$ ............................................. A22C 21/00
[52] U.S. Cl. ............................ 17/11; 17/1 G; 17/46
[58] Field of Search ................... 17/11, 46, 1 G

[56] References Cited
U.S. PATENT DOCUMENTS

| | | | |
|---|---|---|---|
| 3,470,581 | 10/1969 | Hopkins | 17/1 G |
| 4,377,884 | 3/1983 | Viscolosi | 17/11 |
| 4,380,849 | 4/1983 | Adkinson et al. | 17/11 |
| 4,446,600 | 5/1984 | Hooley et al. | 17/11 |
| 4,488,332 | 12/1984 | Atteck et al. | 17/11 |
| 4,669,150 | 6/1987 | Manmoto et al. | 17/11 |
| 4,779,306 | 10/1988 | Ketels | 17/1 G |
| 4,811,456 | 3/1989 | Heuvel | 17/1 G |

Primary Examiner—Willis Little
Attorney, Agent, or Firm—Fleit, Jacobson, Cohn, Price, Holman & Stern

[57] ABSTRACT

An apparatus has a means for engaging a ham and a cutting tool for boning. The means is in the form of a pair of coaxially positioned cylinders having interior spaces for receiving the ham bones mounted for relative reciprocation and a loading trough partly surrounding said cylinders in the ham processing zone. The cutting tool is in the form of a hollow cylinder having an end cutting edge and mounted coaxially on one of said cylinders for reciprocation in the trough with respect to this cylinder of said means.

The invention may be used for boning off thighbones and shinbones of poultry carcasses.

7 Claims, 4 Drawing Sheets

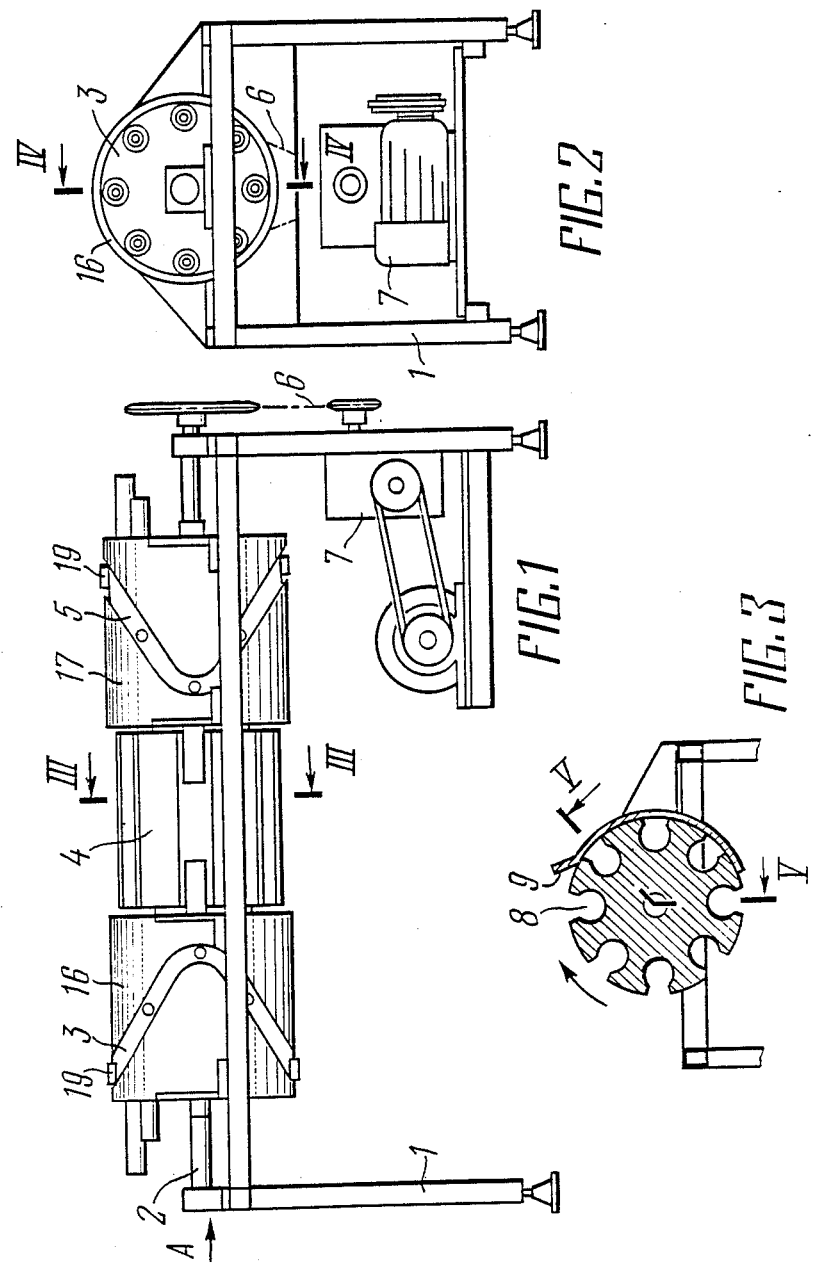

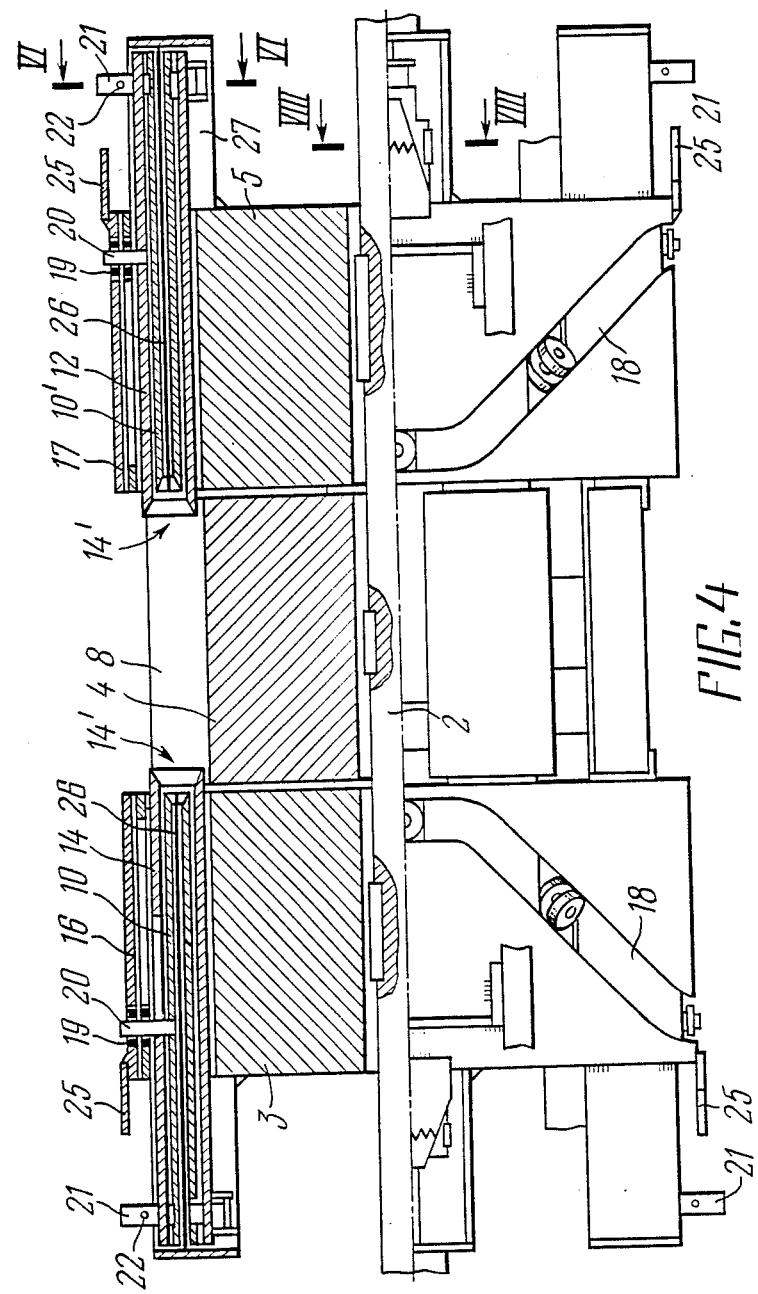

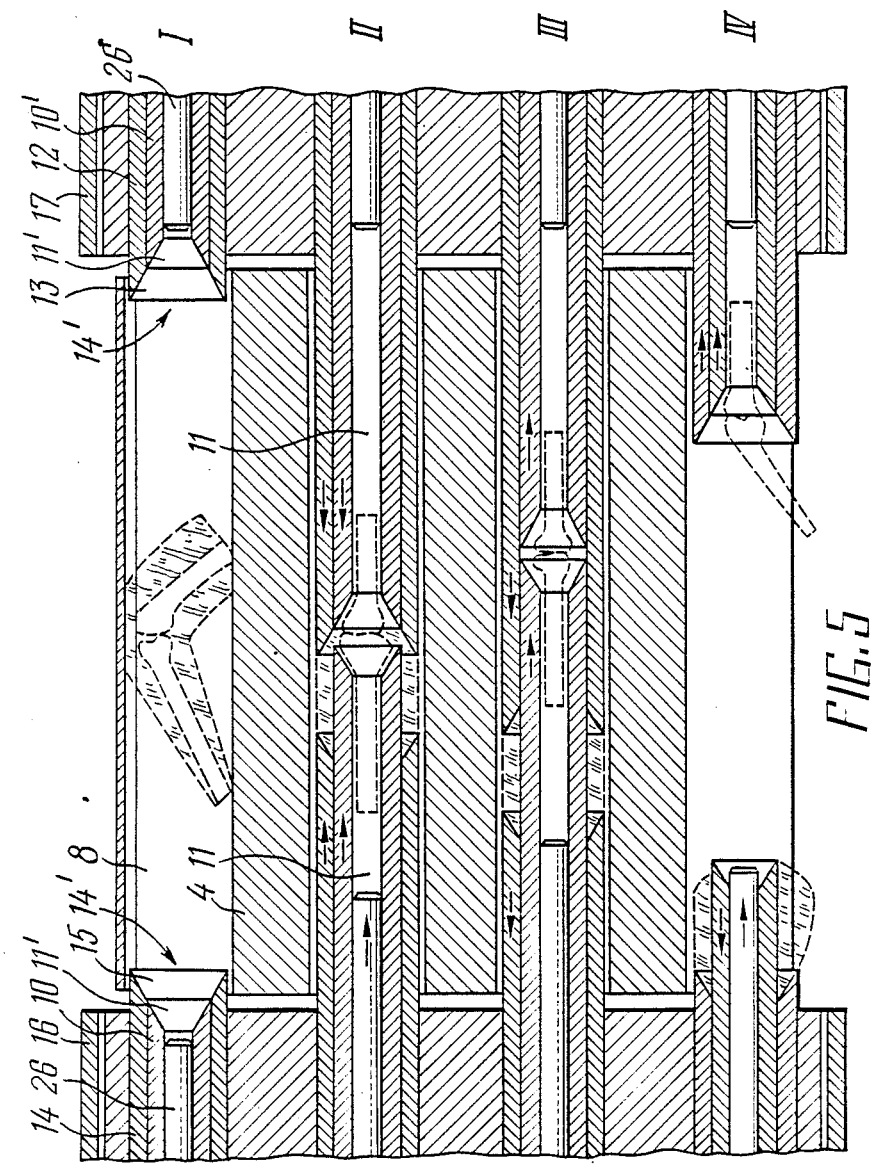

APPARATUS FOR BONING HAMS OF POULTRY CARCASSES

FIELD OF THE INVENTION

The invention relates to apparatuses for processing meat and poultry, and more specially it deals with an apparatus for boning hams of poultry carcasses.

The invention may be most efficiently used for processing commercial poultry farming produce in boning from thigh- and shinbones of poultry carcasses.

The invention may also be used for boning similar parts of commercial husbandry products (such as rams, cows, pigs, goats, etc.).

Background of the Invention

The evergrowing volumes of commercial poultry production nowadays make it necessary to enlarge the range of produce from poultry meat. Commercial manufacture of boneless cookery from poultry meat is indispensable without mechanizing the most labour-consuming process in curving (processing) poultry, i.e. boning to separate meat from bones.

Known in the art is an apparatus for stripping meat off tubular bones (thigh- and shinbones) of poultry carcasses, comprising a frame, a pushrod in the form of an axially movable plunger which incorporates in the end portion thereof a spring-biased means for engaging the ham having a recess which is configured in conformity with the epiphysis of the thigh- or shinbone. The apparatus also has a cutting tool in the form of a pair of flexible partitions having apertures for the passage of the bone and for stripping off meat, and an abutment in the form of a flange limiting displacement of the plunger (U.S. Pat. No. 4,488,332). This apparatus is disadvantageous in that it works intermittently with stoppages for loading and unloading the produce, in a low throughput capacity and in the need to preliminarily cut the hams into thigh and shin, the chunk of meat being obtained either from the shinbone or from the thighbone only.

Also known in the art is an apparatus for boning poultry hams (U.S. Pat. No. 4,669,150), comprising a cutting tool, a means for engaging the ham, a bed, a cam means, and a drive. The cutting tool is in the form of a flexible band knife reciprocating perpendicularly with respect to the bone axis. The means for engaging the ham comprises rings and ensures engagement and tethering of the bone ends. The cam means is in the form of curvilinear guide members ensuring movement of the band knife along the bone along a path conforming to the curvature of the bones.

The apparatus functions in the following manner.

Before feeding to the apparatus, bones of each ham are dismembered at the epiphysis and then the opposite ends of each ham bone are manually inserted into the engagement means which will than automatically tether them. The band knife then reciprocates to move along the bone and to strip meat off the bones. When meat has been stripped off, the engagement means is automatically opened, and the bone is removed from the apparatus.

As the angle of curvature of the ham bones and linear dimensions thereof largely vary, the copying (cam) means has a sophisticated readjustment system, and the use of the band knife does not make it possible to ensure the circular engagement of meat, hence its complete stripping. In addition, throughput capacity of the apparatus is very limited because it is necessary to carry out manual insertion of the ham bone into the apparatus. A serious disadvantage of the apparatus resides in that it has no provision for simultaneous stripping of a whole meat chunk off both shin- and thighbone of the ham so that throughput capacity of the apparatus is lowered and meat quality is impaired.

Summary of the Invention

It is an object of the invention to improve throughput capacity of an apparatus for boning the ham of a poultry carcass.

Another object of the invention is to improve quality of boneless meat.

Still another object of the invention is to lower labour effort in the production of boneless meat.

This object is accomplished by that in an apparatus for boning hams of poultry carcasses, comprising a means for engaging the ham and a cutting tool for boning, according to the invention, the ham engagement means comprises a pair of coaxially positioned cylinders having interior spaces for receiving bones of the ham, which are mounted for relative reciprocation, and loading trough partly surrounding said cylinders in the ham processing zone, the cutting tool comprising a hollow cylinder having an end cutting edge, which is coaxially positioned on one of said cylinders for reciprocation in the trough with respect to the cylinder of the ham engagement means.

The design of the engagement means according to the invention makes it possible to process whole hams by stripping meat simultaneously off both thighbone and shinbone without their preliminary dismembering so as to produce boneless meat of a better quality in the form of a whole chunk without disrupting the natural structure of muscles.

This substantially enhances throughput capacity of the apparatus and lowers labour effort in processing poultry carcasses since there is no need in dismembering of the poultry ham into the thighbone and shinbone.

The cylinders of the engagement means preferably have tapering counterbores in the end faces thereof facing towards each other.

This design of the cylinders of the engagement means enhances reliability of engagement of the free ends of the ham bones when cylinders move opposite to each other in the trough.

It is preferred than an abutment be provided in the interior space of each cylinder for reciprocation with respect to the cylinder.

The provision of the abutments allows bare bones of the ham to be ejected from the interior spaces of the cylinders of the engagement means.

In the preferred embodiment of the invention, a hollow cylinder having a tapering counterbore in one end face thereof facing towards the cutting tool is provided on one of the cylinders of the engagement means to extend coaxially with the cylinder so as to reciprocate in the trough with respect to the cylinders of the engagement means.

This construction of the apparatus allows reliability of engagement of the free ends of the ham to be enhanced.

In accordance with another embodiment of the invention, a plant comprises a plurality of troughs and a corresponding number of pairs of cylinders of the ham engagement means installed on carriers, and there is provided a drive for a synchronous movement of the cylinders and troughs for forming a station for processing hams of poultry carcasses.

This construction of a plant makes it possible to substantially enhance throughput capacity of processing of poultry carcasses because several hams can be simultaneously processed in the plant. The provision of the drive allows movement of all cylinders to be carried out in accordance with a preset program.

In accordance with another embodiment of the invention, the carriers are in the form of three coaxially positioned drums: a central drum and two lateral drums, the central drum carrying the troughs and a fixed guide member surrounding its cylindrical periphery in the ham processing zone and the lateral drums carrying the cylinders of the engagement means.

The apparatus according to the invention which is so constructed can ensure the synchronous movement of the drums carrying the troughs and the cylinders of the ham engagement means. The provision of the guide member makes it possible to cover the interior of the troughs during processing of hams and to prevent the ham bones from folding at the knee joint.

It is preferred that all drums be rigidly secured to a common shaft.

This embodiment of the invention substantially simplifies construction of the apparatus. The provision of the common shaft for the drums facilitates the synchronous movement of the drums.

BRIEF DESCRIPTION OF THE DRAWINGS

Other objects and advantages of the invention will become apparent from the following detailed description of embodiments thereof with reference to the accompanying drawings, in which:

FIG. 1 is a general view of an apparatus according to the invention;

FIG. 2 is a view taken along arrow A in FIG. 1;

FIG. 3 is a sectional view taken along line III—III in FIG. 1;

FIG. 4 is a sectional view taken along line IV—IV in FIG. 2;

FIG. 5 is a sectional view taken along line V—V in FIG. 3.

Detailed Description of Preferred Embodiments

Figure 6:
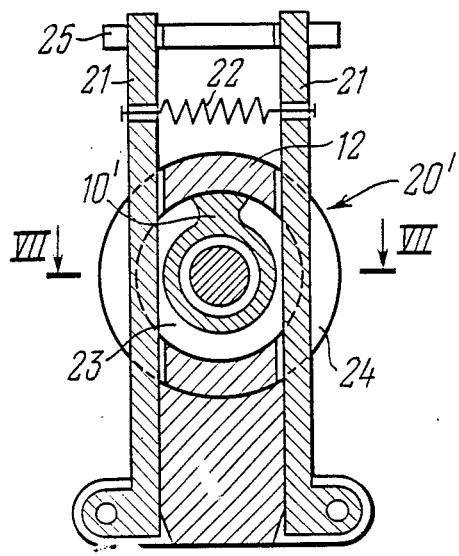
FIG. 6 is a sectional view taken along line VI—VI in FIG. 4.
Figure 7:
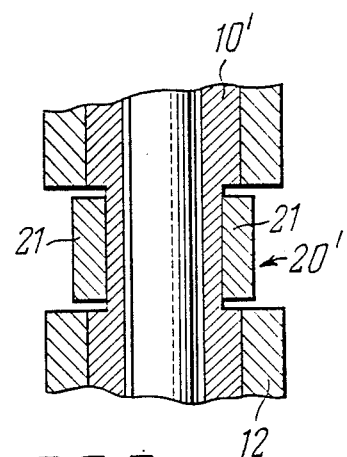
FIG. 7 is a sectional view taken along line VII—VII in FIG. 6.

An apparatus for boning hams of poultry carcasses comprises a frame 1 (FIGS. 1 through 4) on which there is installed a common shaft 2 carrying three rigidly secured drums 3, 4, 5. The shaft 2 is coupled by means of a chain transmission 6 to a drive 7. The central drum 4 carries a plurality of loading troughs 8 which are in the form of longitudinally extending grooves made in the cylindrical periphery of the drum 4 along the entire length thereof.

The frame 1 supports a rigidly secured fixed guide member 9 (FIG. 3) surrounding the cylindrical periphery of the drum 4 in the ham processing zone.

Each lateral drum 3, 5 carries a plurality of cylinders 10, 10' (FIG. 4) equally spaced along its periphery and having interior spaces 11 for receiving bones of the ham, each cylinder 10 of the drum 3 being positioned coaxially with respect to one of the cylinders 10' of the other drum 5, and with respect to a respective trough 8. Tapering counterbores 11' are made in the end faces of the cylinders 10, 10' facing towards each other.

A cutting tool 12 in the form of a hollow cylinder having a cutting edge 13 is mounted on each cylinder 10' coaxially therewith, and a hollow cylinder 14 having a tapering counterbore 15 in one of the end faces thereof facing towards the cutting tool 12 is provided on other cylinder 10 coaxially therewith. All cylinders 10, 10', 12, 14 are mounted for reciprocations in respective troughs 8. The cylinders 10, 10' and 14 form with the troughs 8 a means 14' for engaging hams of poultry carcasses.

Each drum 3, 5 is coaxially positioned in a fixed cylindrical cam means 16, 17 (FIG. 1) rigidly secured to the frame 1 and has a circular groove 18 (FIG. 4) in which roll rollers 19 mounted on axles 20 which are rigidly secured to the cylinder 10 of the drum 3 and to the cutting tool 12 of the drum 5, respectively.

The configuration of the circular groove 18 is chosen in accordance with the path of movement of the cylinders 10, 10', 12, 14 which, in turn, depends on the stereometric dimensions of the hams of poultry carcasses.

The pair of cylinder 10' and 12 of the drum 5 are coupled together at a certain time moment by means of locks 20' (FIG. 6) which are in the form of two plates 21 (FIG. 6) pivotally mounted on the cylinder 14 and biased toward one another by a spring 22, an annular groove 23 in the cylinder 10', and rectangular holes 24 in the cylinder 12. Locks 20' of a similar design are provided for the drum 3, the holes 24 being provided in the cylinder 14. The locks 20' are controlled by wedge-shaped bars 25 which are rigidly secured to the cam means 16, 17 (FIG. 4). Abutments 26 provided in the hollow cylinders 10, 10' are fixed to arms 27 secured to the frame 1.

The apparatus functions in the following manner.

Figure 8:
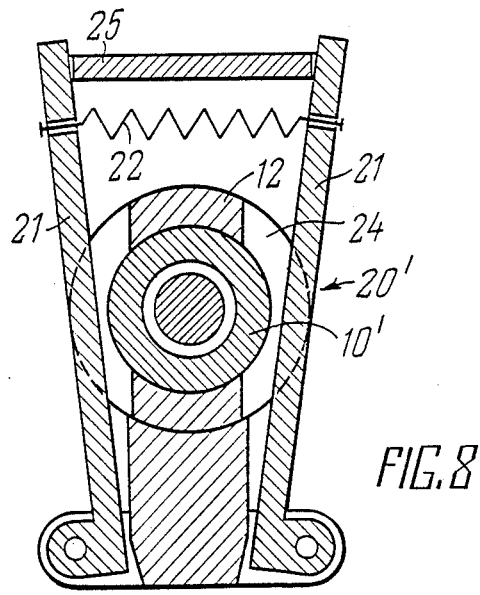
FIG. 8 is a sectional view taken along line VIII—VIII in FIG. 4.

Before starting operation, the ham is placed manually or by means of a special device into the top trough 8 of the drum 4 (stage I in FIG. 5). When the drive 7 is switched on, and the shaft 2 with the drums 3, 4, 5 starts rotating, the trough 8 supporting the ham moves in the direction towards the guide member 9 which covers the trough 8 thus preventing the ham from falling out. At the same time, the hollow cylinders 10 of the drum 3 and the cylinders 12 of the drum 5 are caused to move under the action of the cooperating circular grooves 18 of the cam means 16, 17, rollers 19 and axles 20 in opposition to each other and so that the cylinders 14 of the drum 3 and the cylinders 10' of the drum 5 also move simultaneously therewith. In this position the pairs of the cylinders 10, 14 and cylinders 10', 12 form conical surfaces on their opposed end faces so that the ends of the ham bones are freely received in the interior spaces 11 of the cylinders 10, 10'. Then there is no need for the cylinder 14, and the associated lock 20' is opened by means of the associated wedge-shaped bar 25 (FIG. 8), and the cylinder 14 is stopped. The remaining members continue to move until the cylinders 10' come close to the knee joint of the ham (stage II in FIG. 5). By that moment meat has been stripped by the end faces of the cylinders 10, 10' off the bones (except for the knee joint) and is carried on the cylinders 10, 10'. At that moment the lock 20' for the cylinder 10' of the drum 5 is opened by the associated bar 25 to disengage the cylinder 10' from the cutting cylinder 12, and during further movement of the cylinder 10 of the drum 3 and the cutting tool 12 of the drum 5, meat is cut off the knee joint and moved along the cylinder 10 of the drum 3 through a certain distance to guarantee complete breakage of the tendons (stage III in FIG. 5).

The configuration of the circular grooves 18 will then ensure the return movement of the system rollers 19-axles 20-cylinders 10-cylinders 14 so that meat is ejected by the cylinders 14 from the lower groove 8 to an underlying conveyor or container (not shown). The bones also fall down from the trough 8 to a conveyor or container and, if the bones are jammed in the interior spaces 11 of the cylinders 10, they are removed by means of the abutments 26 (stage IV in FIG. 5). At the same time the cylinder pairs consisting of cylinder 10-cylinder 14 and cylinder 10'-cutting tool 12 are again coupled together by the locks 20', respectively, and the process of boning of hams is repeated.

What we claim is:

1. Apparatus for boning hams of poultry carcasses, comprising:
   means for engaging a ham, said means being made in the form of at least a pair of coaxially positioned first and second cylinders having interior spaces for receiving ham bones and a loading trough partly surrounding said cylinders when said cylinders are in a ham processing zone;
   said cylinders being mounted for relative reciprocation; and
   a cutting tool, said cutting tool comprising a hollow cylinder having an end cutting edge and coaxially mounted on one of said first and second cylinders for reciprocation in the trough with respect to said first and second cylinders.

2. Apparatus as defined in claim 1, wherein the first and second cylinders of said ham-engaging means have tapering counterbores in end faces thereof facing towards each other.

3. Apparatus as defined in claim 1, wherein an abutment is provided in the interior of each of the first and second cylinders of said ham-engaging means, said each cylinder being reciprocable with respect to said abutment.

4. Apparatus as defined in claim 1, wherein an additional hollow cylinder is provided on one of the first and second cylinders of said ham-engaging means opposite to the cutting tool coaxially therewith for reciprocation in the trough with respect to the first and second cylinders, with an end face of the additional hollow cylinder facing towards the cutting tool having a tapering counterbore.

5. Apparatus as defined in claim 1, further comprising a plurality of troughs, each of the troughs having associated therewith a respective pair of said first and second cylinders of said ham-engaging means, said troughs and said first and second cylinders being mounted on respective carriers, and sole drive means for providing synchronous movement of the cylinders and troughs to form a plurality of stations for processing the hams of the poultry carcasses.

6. Apparatus as defined in claim 5, wherein said carriers are in the form of three coaxially positioned drums including one central drum and two lateral drums, the central drum carrying said troughs and being provided with a fixed guide member surrounding its cylindrical periphery in the ham processing zone, and the lateral drums carrying said first and second cylinders of said ham-engaging means.

7. Apparatus as defined in claim 6, wherein all of said drums are rigidly secured to a common shaft.

* * * * *

UNITED STATES PATENT AND TRADEMARK OFFICE
CERTIFICATE OF CORRECTION

PATENT NO. : 4,944,067

DATED : July 31, 1990

INVENTOR(S) : Kulishev, et al.

It is certified that error appears in the above-identified patent and that said Letters Patent is hereby corrected as shown below:

Title page, insert Assignee in item:

[73] NAUCHNO-PROIZVODSTVENNOE OBIEDINENIE PTITSEPERERABA-TYVAJUSCHEI I KLEEZHELATINOVOI PROMYSHLENNOSTI, USSR, Moskovskaya oblast Signed and Sealed this Twelfth Day of May, 1992

Attest:

DOUGLAS B. COMER

Attesting Officer

Acting Commissioner of Patents and Trademarks